No. 858,297. PATENTED JUNE 25, 1907.
J. L. LATIMER.
INSTRUMENT FOR MEASURING AND CORRECTING ERRORS OF GUN FIRE.
APPLICATION FILED MAY 8, 1906.
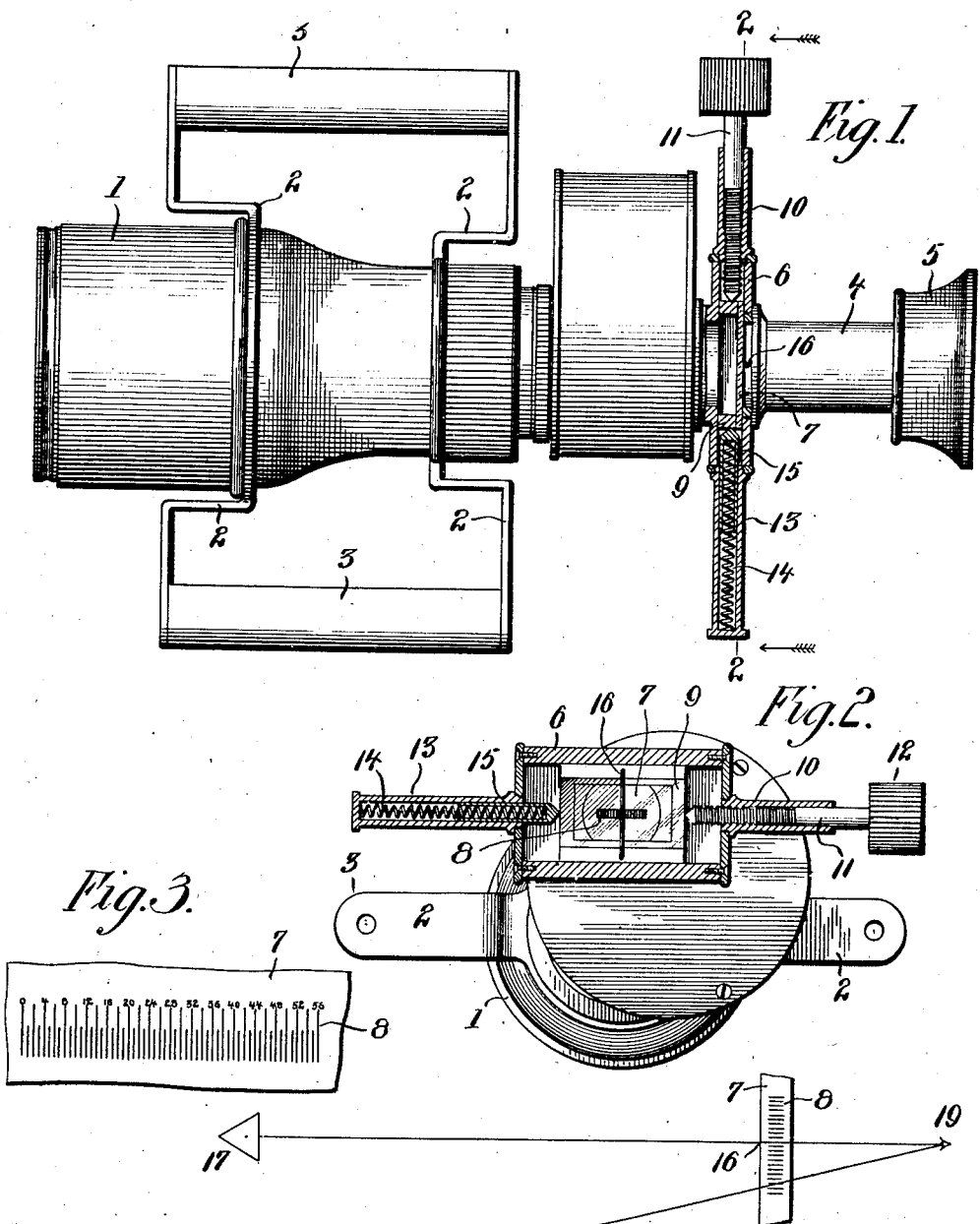
WITNESSES:
INVENTOR
Julian L. Latimer.
BY E. B. Stocking
Attorney

UNITED STATES PATENT OFFICE.

JULIAN L. LATIMER, OF WASHINGTON, DISTRICT OF COLUMBIA.

INSTRUMENT FOR MEASURING AND CORRECTING ERRORS OF GUN-FIRE.

No. 858,297.  Specification of Letters Patent.  Patented June 25, 1907.

Application filed May 8, 1906. Serial No. 315,840.

*To all whom it may concern:*

Be it known that I, JULIAN L. LATIMER, lieutenant-commander in the United States Navy, stationed at the Bureau of Ordnance, Washington, District of Columbia, have invented certain new and useful Improvements in Instruments for Measuring and Correcting Errors of Gun-Fire, of which the following is a specification, reference being had therein to the accompanying drawing.

This invention relates to an instrument for measuring and correcting errors of gun fire, and particularly for determining the lateral error of a shot relative to the object at which it is aimed.

The invention has for an object to provide in an optical instrument a transparent scale having successive graduations thereon corresponding with those of a piece of ordnance together with a hair line crossing said scale and means for adjusting said scale laterally of said line whereby the angular lateral distance of the fall of the shot from the object can be instantly read from the scale, and the latter adjusted in azimuth to exactly correspond with each movement of the gun sight whereby successive errors can be read in the same terms as the lateral graduations of the sight, and the reading of the scale applied directly to the sight scale of the gun without calculations and without reference to tables.

The invention has for a further object to provide a novel and improved construction for mounting the adjusting scale, and also a graduation of the scale in fixed angles of 3' and 26" so that if the distance is known, the lateral error can be readily determined as each division of the scale will subtend a chord 1/1000 of the distance.

Other and further objects and advantages of the invention will be hereinafter set forth and the novel features thereof defined by the appended claims.

In the drawing:—Figure 1 is a plan of a monocular telescope with parts in horizontal section; Fig. 2 is a vertical section on the line 2—2, Fig. 1; Fig. 3 is an enlarged elevation of the scale, and Fig. 4 is a diagram showing the angle measured by the scale.

Like numerals of reference indicate like parts in the several views of the drawing.

This invention is adapted for application to any character of optical instrument, but for the purpose of illustration is herein shown as used in connection with a monocular glass or telescope 1 having the usual construction and arrangement of lenses therein, and provided with the frame 2 extended laterally thereof at each side where handles 3 are mounted so that the instrument may be conveniently grasped and held by both hands of the observer, while the eyepiece 4 thereof is provided with the rubber guard 5 of ordinary construction, which may be firmly pressed against the face so that the eye will be at the proper distance from the eyepiece. At one end of this eyepiece a casing 6 is mounted and adapted to carry the transparent scale 7 which is fitted in the focus of the object glass and provided with horizontally arranged graduations 8 thereon. These graduations correspond with those of the azimuth scale for indicating the lateral sighting of a gun or other piece of ordnance so that the readings taken from this horizontal scale exactly agree with those upon the gun. The transparent scale is mounted in the frame 9 adapted to slide within the casing 6 which is provided at one end with an interiorly threaded collar 10 within which an adjusting screw 11 is mounted and bears at its inner end against the frame 9, while its outer end is provided with a milled head 12 adapted to be readily moved by the thumb of the observer's hand. At the opposite side of the casing 6, a tubular shell 13 is secured and within the same a restoring spring 14 is disposed, which spring is provided at its inner end with a contact point 15 bearing upon the end of the frame carrying the transparent scale 7. At one side of this scale a hair line 16 is secured in either fixed or adjustable position, but is relatively fixed to the movement of the scale upon the same. This hair line indicates and corresponds with the pointer of the gun or piece of ordnance to be fired. The graduations upon the transparent scale are in angles of 3' 26" and numbered consecutively from left to right, as shown in Fig. 3, every fourth graduation being numbered and the middle number corresponding with the center of the field when the graduations are centered. Each graduation of the scale is a chord of the millieme and is equal to 1/1000 of the radius of its circle, as the lateral deviation can always be given in yards, for example, the lateral deviation in yards for one millieme being 1/1000 of the distance, if the range is 2000 yards, the lateral deviation 2 milliemes, the lateral error will be 4 yards.

In the diagram shown in Fig. 4, the target or object is indicated at 17 and the lateral deviation of the shot at 18. The lines from these two points passing through the transparent scale meet at the eye point 19 so that the graduations corresponding to the intersecting lines may be readily observed, it being understood that the hair line 16 is centered on the target.

In the use of this instrument the person detailed to the duty of correcting the lateral errors of the gun fire is stationed in the proper position and sights the hair line centrally upon the target, it being understood that the graduations upon the scale correspond to those upon the lateral or azimuth scale of the gun. Upon firing the first shot the flight of the projectile is observed and its point of contact noted upon the scale so that the graduation thereof may be instantly read and the distance from the hair line, which indicates the point of the target desired to be hit, designates the lateral deviation of the shot. The observer then signals to the gunner the number of the graduation indicated upon his scale and the azimuth pointer on the gun is adjusted to the same number. The observer then moves the scale by the lateral adjusting means so as to bring the graduation of the point of contact just noted into alinement with the hair line. He then notes the second shot, in the same way keeping the hair line upon the point to be hit and noting the fall of the projectile on his scale, the number of the graduation of the scale on which the second shot falls is then signaled to the battery where the sight is then accordingly corrected and the observer's scale is again moved until this graduation coincides with the hair line. By this method the horizontal scale is always the same as the azimuth scale of the gun, and the observer can signal to the gunner exactly the mark on the sight scale to which the azimuth pointer must be set to correct the error of the last shot. The hair line indicates the center of the target when sighted thereon and the graduation at which the projectile contacts indicates the angular error of that shot so that a movement of the gun and scale to bring the projectile graduation in alinement with the hair line produces an absolute correction of the error in laying the gun. It is not necessary to remember the figures of the last order, or whether they be to the right or left of the hair line, and the possibility of error in the excitement of action is completely removed. For instance, if one of the gunners fails to get the signal, the next subsequent signal will give him the proper position of the sight pointer to correct all previous errors. In using this instrument it is only necessary that the officer observe the fall of the shot so that the lateral errors can be immediately corrected without calculation or reference to tables.

It will also be observed that this instrument provides means by which the scale can be moved in azimuth, to exactly correspond to each movement of the gun sight so that each successive error can be read in the same terms as the lateral graduations of the sight and the reading of the scale applied directly thereto.

While reference has been made to the reading of lateral deviations of a shot, the invention is not confined to a deviation in a horizontal plane at either side of the target, but also comprehends the reading of such deviations in any direction from the center of the target.

Having now described my invention and set forth its merits, what I claim and desire to secure by Letters Patent is:—

1. In an instrument of the class described, a transparent scale provided with indicating characters extending laterally of the instrument, a hair line crossing said scale, and means for adjusting said scale laterally of said line.

2. In an instrument of the class described, a transparent scale graduated to correspond with the lateral or azimuth scale of a piece of ordnance, a hair line crossing said scale corresponding to the pointer of the sight, and means for adjusting said scale laterally of said line.

3. In an instrument of the class described, a transparent scale provided with successively increasing indicating characters extended laterally thereon, a hair line crossing said scale, and means for adjusting said scale laterally of said line.

4. In an optical instrument of the class described, a casing disposed laterally of the eyepiece thereof, a graduated sliding plate mounted within said casing, a hair line supported by the casing at one side of said plate, an adjusting screw having a threaded bearing at one end of said casing and adapted to move said plate in one direction, and a restoring spring at the opposite side of the casing adapted to move said plate in the opposite direction.

5. In an optical instrument of the class described, a transparent scale graduated to indicate equal angles radiating laterally from the optical center of the instrument, a hair line crossing said scale, and means for adjusting said scale laterally of said line.

6. In an optical instrument of the class described, a transparent scale graduated to correspond with the lateral graduations of a gun sight and provided with controlling means whereby the angular lateral distance of the fall of a shot from the object aimed at may be read directly from said scale in the terms of the sight graduations.

7. In an optical instrument of the class described, a transparent scale graduated to correspond with the lateral graduations of a gun sight and provided with controlling means constructed to adjust said scale in azimuth across a hair line to the successive movements of the gun sight whereby each successive angular error in the fall of the shot may be read directly from said scale in the terms of the lateral graduations of the sight.

In testimony whereof, I affix my signature in presence of two witnesses.

JULIAN L. LATIMER.

Witnesses:
JOHN L. FLETCHER,
ALFRED T. GAGE.